INVENTORS.
RALPH H. BETER
MORRIS RUBINOFF
BY
ATTORNEY

United States Patent Office 2,888,647
Patented May 26, 1959

2,888,647

SYSTEM FOR REPRESENTING A TIME INTERVAL BY A CODED SIGNAL

Ralph H. Beter, Philadelphia, and Morris Rubinoff, Sharon Hill, Pa., assignors to Philco Corporation, Philadelphia, Pa., a corporation of Pennsylvania Application May 23, 1955, Serial No. 510,172

8 Claims. (Cl. 332—11)

The present invention relates to computer systems and more particularly to systems for converting between a coded representation of a time interval and a signal having a duration equal to the time interval represented by the code.

In many computer systems, and in computer components of other systems such as radar systems, it is frequently necessary or desirable to represent information in different forms for different purposes. For example, information may be accumulated as the time duration of various electrical signals, processed as a coded sequence of electrical impulses, and utilized as the time duration of other electrical signals. Obviously means must be provided for converting between the electrical signals representing information by their time duration and coded groups of electrical signals representing the same information but in a different form.

One method which has been employed in the past, of representing the time duration of a signal by a coded group of signals, includes the steps of establishing a clocking pulse source which produces a series of equi-spaced clocking pulses, supplying these clocking pulses and the information bearing signal to a coincidence circuit which passes the clocking pulses only during the interval represented by the second signal, and then supplying the clocking pulses passed by the coincidence circuit to a counting circuit which produces the desired coded signal.

Coded signals have been converted to signals of indicated time duration by first presetting the code in a suitable register or counting circuit. The counting circuit is arranged to count the pulses supplied thereto and to provide an indication when the number of clocking pulses counted thereby is equal to the number represented by the present code. The interval between the first clocking pulse supplied to the register or counting circuit and the time of occurrence of the above-mentioned indication is the time interval represented by the code. In some systems a bi-stable circuit may be triggered to one stable state by the first clocking pulse and then returned to its initial stable state upon the occurrence of the above-mentioned indication. The signal supplied by this bi-stable circuit is an electrical signal having a duration equal to the time duration represented by the code. These prior art circuits have the disadvantage that the unit employed in measuring or generating a signal is one period of the clocking signal. Generally fractions of a period are disregarded both in the measuring operation and in the generating operation. For example, if the repetition rate of the clocking signal is chosen to be one megacycle per second, the measuring circuit will indicate how many one-microsecond intervals are contained in the signal to be measured. Fractions of a period generally are not registered. Furthermore, it is often necessary to provide suitable phasing means to cause the initial portion of the signal to be measured to occur in time coincidence with a clocking pulse. similarly the duration of signals generated by a system controlled by a one-megacycle clocking signal can be increased in steps of one microsecond but not by fractions of a microsecond. Greater precision can be achieved by increasing the frequency of the clocking signal. However, it is not always convenient or practical to use a high frequency clocking signal. For example, if a time interval of 103.4 microseconds is to be measured with a clocking signal having a frequency of one megacycle, the counter or register need only be capable of counting approximately 104 signals. If a 10 megacycle clocking frequency is employed, the counter would be required to register the number 1,034. This would require several additional registers if the computer employs a binary code. The use of the higher clocking frequency has the added disadvantage that, while only a very small part of the computer system may require the higher precision afforded by the higher clocking frequency, the entire computer may have to be arranged to handle the higher frequency.

Therefore it is an object of the present invention to provide a novel system which will measure or generate signals representing time intervals with greater precision than systems heretofore known in the art.

It is a further object of the invention to provide a novel system that employs reference intervals of two different durations in measuring or generating a signal.

It is a further object of the invention to provide a novel system which will measure or generate a signal to a precision which is a preselected fraction of the basic measuring interval of the system.

Another object of the present invention is to provide a novel system for converting between a digital code and an electrical signal having a time duration which may be represented by the digital code.

Still another object of the present invention is to provide a system which will measure the duration of signals which do not start in synchronism with a clocking signal.

In general, these and other objects of the invention are accomplished by providing a system which employs a relatively low clocking frequency. In measuring the time duration of a signal the number of periods of this relatively low clocking signal contained in the signal is determined. Other portions of the system determine the magnitudes of the fractional parts of the clocking periods occurring between the start of the signal and the first integral period and between the end of the last integral period and the end of the signal to be measured. This determination is made by a vernier circuit which effectively subdivides a period of the clocking signal into smaller intervals and compares the duration of the fractional periods with the subdivided periods. The coded output signal is made up of two parts, one part representing the number of basic periods and the second part representing the number of additional subdivided periods contained in the signal to be measured.

In generating the signal, the number of basic intervals and the number of subdivided periods to be included in the final output signal are again represented by separate parts of the coded signal. A suitable timing device turns on a signal generating circuit for the interval representing the number of basic intervals to be included in the output signal and then energizes a vernier circuit which turns off the signal generating circuit after the indicated number of subdivided intervals have elapsed.

For a better understanding of the invention together with other and further objects thereof reference should now be made to the following detailed description which is to be read in conjunction with the accompanying drawings in which:

Fig. 3 is a block diagram of a modification of a portion of the circuit shown in Fig. 2.

Figure 1:
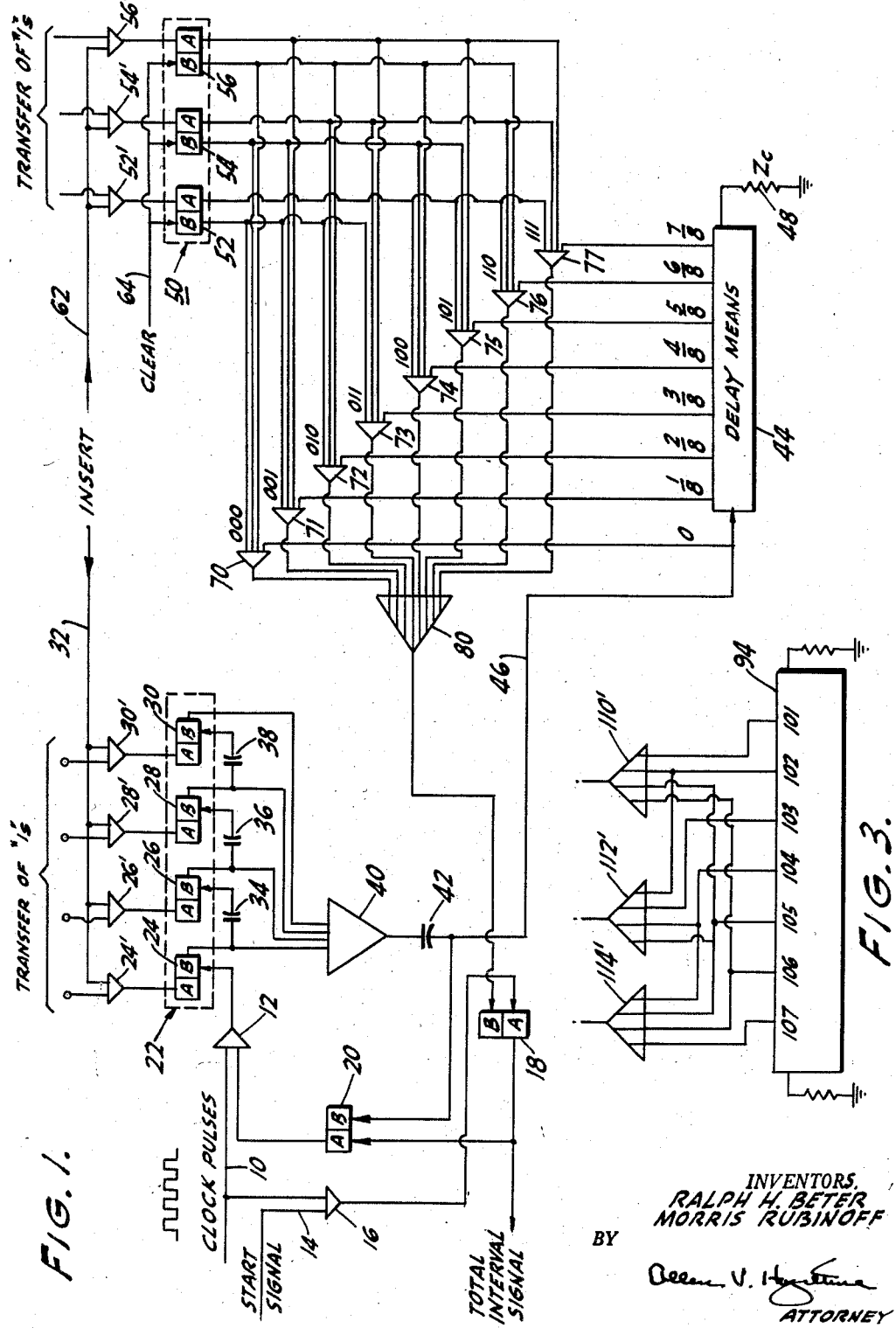
Fig. 1 is a diagram, partly in block form, showing a preferred embodiment of the invention which will convert a digital code to an electrical signal having a duration represented by the code.

In Fig. 1 clock pulses are supplied over a lead 10 to an "and" gate 12. An "and" gate is a form of coincidence circuit or gate circuit which will generate an output signal only in response to a preselected signal on all input leads. A start signal is supplied by way of lead 14 to a second "and" gate 16 which also receives clock pulses from lead 10. The output of "and" gate 16 is supplied to the A side of a bi-stable circuit 18. The letters A and B are used in the drawing to represent the two halves of the bi-stable circuits. However, it should be remembered that the two halves of a bi-stable circuit are in many cases identical in their construction. The connection from "and" gate 16 to circuit 18 is such that circuit 18 is caused to change from one stable state $b$ to the other state $a$ upon the occurrence of a signal at the output of gate circuit 16. The output of "and" gate 16 is supplied also to the A half of a second bi-stable circuit 20. This connection is made in such a manner that circuit 20 changes from one stable state $b$ to the other state $a$ at the same time that circuit 18 changes to the state $a$. Bi-stable circuits 18 and 20 may be the well known Eccles-Jordan circuits or any bi-stable circuits equivalent thereto. The connections required to cause two such circuits to operate together are well known to those skilled in the art. The output of circuit 20 is supplied to a second input of "and" gate 12. The output of "and" gate 12 is supplied to an input of a register 22 composed of bi-stable circuits 24, 26, 28 and 30. Register 22 is of conventional design and has a capacity of four binary digits. The invention is not to be limited to counts of a magnitude that can be represented by four binary digits. Registers employing more or fewer elements than register 22 may be employed. Furthermore, number systems other than binary may be accommodated if appropriate storage and counting techniques are used. "And" gates 24', 26', 28' and 30' are provided as a means for transferring information from an external source, for example a section of a computer, to register 22. The register 22 is arranged for the simultaneous transfer of information to each of the four elements 24, 26, 28 and 30 at a time preceding the start signal, determined by a signal supplied by way of lead 32. The method or sequence for transferring information into register 22 is not a concern of this invention; therefore parallel transfer has been described only as an example. Capacitors 34, 36 and 38 in register 22 indicates one method for transferring information from one unit of the register to the next when the register is responding to clock pulses, but not when it is responding to signals supplied by way of gates 24', 26', 28' and 30'. Connections are made from units 24, 26, 28 and 30, respectively, to four inputs of an "and" gate 40. As suggested above, a predetermined signal is required on all four inputs of "and" gate 40 before an output signal is generated. The output of "and" gate 40 is supplied through capacitor 42 to a second input of bi-stable circuit 20 and to the input of delay means 44. Any type of counter circuit that can be set to count out any given number of steps is suitable for use in register 22. As shown in Fig. 1, register 22 is presumed to end its count at zero so that it is not necessary to clear the register before reuse.

Delay means 44 is provided with a series of output taps which are so arranged that a signal supplied to input lead 46 will appear at the output leads in succession. Preferably the delay between any two adjacent taps is a preselected fraction of the total delay of delay means 44. In the example chosen for illustration in Fig. 1, the delay between adjacent taps is made equal to ⅛ of the total delay. The total usable delay of delay means 44 is equal to one clocking pulse period minus one of the preselected fractions of that period. Therefore, it would be possible to terminate the delay line at the ⅞ tap in Fig. 1. Delay means 44 may be a section of transmission line provided with taps at appropriate intervals, a series of sections of artificial transmission line composed of inductors and capacitors, or a series of any convenient form of delay stage employing only passive circuit elements or passive and active circuit elements. A resistor 48 is provided for terminating delay means 44 in its characteristic impedance to insure that negligible reflection of the delayed pulse will occur.

A second register 50, including units 52, 54 and 56, is provided for controlling the vernier portion of the system of Fig. 1. Register 50 is similar to register 22 except that the capacitors which couple adjacent units in register 22 are not found in register 50. That is, register 50 need not be equipped to perform counting because it is used only for static storage. "And" circuits 52', 54' and 56' are provided to permit transfer of information into vernier register 50. Again, the method or sequence of transferring information into register 50 is not the concern of this invention and parallel transfer has been described only by way of example. The time at which the information is transferred may coincide with that of the signal on lead 32, but in any case precedes the signal on lead 46, and is controlled by an insert signal supplied by way of lead 62. A second input connection 64, which is common to all units of register 50, may be provided for clearing the register of previously stored information. Register 50 and the several taps on delay means 44 are interconnected by a series of "and" gates 70-77 inclusive, the final digit of each reference numeral corresponding to the number of ⅛ delay represented by the tap with which it is associated. For example, "and" gate 73 is associated with the ⅜ tap on delay means 44. The B half of bi-stable unit 52 is connected to "and" gates 70-73 inclusive. The A half of unit 52 is connected to "and" gates 74 through 77 inclusive. Similarly the B half of unit 54 is connected to "and" gates 70, 71, 74 and 75, while the A half of unit 54 is connected to "and" gates 72, 73, 76 and 77. The B half of unit 56 is connected to "and" gates 70, 72, 74 and 76, and the A half is connected to the odd numbered gates 71, 73, 75 and 77. It should be noted that each of the "and" gates is connected to one side or the other of each of the three units 52, 54 and 56 in register 50. Although in Fig. 1 the inputs to gates 70-77 inclusive are connected to bi-stable circuits 52, 54 and 56 according to a binary code, other codes may be used instead.

The outputs of all the "and" gates 70-77 inclusive are connected to the several inputs of "or" gate 80. An "or" gate is a circuit which will provide an output signal if an input signal appears at any one or more than one of several inputs.

The output of "or" gate 80 is connected to a second input of bi-stable circuit 18. The connection from "or" gate 80 to circuit 18 is such that circuit 18 is returned to the stable state $b$ which existed prior to the application of the signal from "and" gate 16. The output signal of the circuit of Fig. 1 is taken from bi-stable circuit 18. This output signal will have the form of a rectangular voltage wave having a duration determined by the information set into main register 22 and vernier register 50.

The circuit of Fig. 1 is arranged to generate an electrical signal having a duration equal to that represented by a code impressed on registers 22 and 50. Register 22 indicates the number of whole periods of the clocking pulse contained in the signal to be generated. Vernier register 50 indicates the number of the fractions of the clocking pulse period which are to be included in the generated interval. Normally register 22 will have been cleared of all stored information by a previous operation of the circuit, although a means to clear may be provided if desired, for example when first turned on. However, register 50 will have information from a previous operation stored therein. Therefore it is necessary to clear register 50 before initiating each operation of the circuit of Fig. 1. The register 50 is cleared by supplying a signal over lead 64 which sets units 52, 54 and 56 so that the output of the B half of each circuit is effective. The output of the A half of each of these three circuits will then be ineffective. In other words, the units 52, 54 and 56 will all be in state $b$. This condition represents zero stored information. In register 22 units 24, 26, 28 and 30 will also be in state $b$, with the B half of each unit effective and the A half ineffective. By supplying a gating pulse to lead 32, signals will appear at the A halves of units 24, 26, 28 and 30 through gates 24', 26', 28' and 30', respectively, only if a "one" signal is transferred from the suitable external circuit to the associated inputs of gates 24', 26', 28' and 30'. For example, a signal will appear at the A half of unit 24 if and only if a "one" signal appears at the one input to gate 24' at the same time that the gating pulse on lead 32 is applied to the other input of gate 24'. Since a signal appearing at the A half of unit 24 sets unit 24 into its $a$ state, and similarly for units 26, 28 and 30, the result of applying a gating pulse to lead 32 is the transfer of the information from the external circuit into register 22, which is capable of registering any number of units up to sixteen. By applying a gating pulse to lead 62, vernier information is transferred in a similar manner into register 50, which can register any number of fractions up to eight.

The system of Fig. 1 operates in the following manner. The start signal and the clock pulses are supplied by way of inputs 10 and 14 to "and" gate 16. An output signal will be generated by "and" gate 16 for the clock pulse which coincides with the start signal. Ideally the start signal should have a value just slightly greater than the interval between the trailing edge of one clock pulse and the leading edge of the next. If the start signal is of shorter duration, it is possible that no coincidence will occur between the start signal and a clock pulse. If it is of longer duration, two clock pulses will coincide with the start signal. This will result in two signals being supplied to the A side of bi-stable circuit 18 from "and" gate 16. The application of two "start" signals to this circuit will be a disadvantage only if the interval to be measured is less than one clock pulse period in duration. The connection to bi-stable circuit 18 may be such that this circuit responds only to the first received pulse and is insensitive to further pulses applied to the same point until after a signal has been supplied to the B side of the circuit. If it is expected that intervals of less than one clock pulse period in duration may be encountered the second pulse may be eliminated by connecting the output of "and" gate 16 back to the input through a delay line having a delay equal to one pulse period. The connection should be such that the second pulse is inhibited by the delayed first pulse. The signal from "and" gate 16 causes the bi-stable circuit 18 to change from one stable state to the other. It will be assumed that the output signal of the A half of the bi-stable circuit 18 was low before the application of the signal from "and" gate 16 and becomes high upon application of this signal. The signal from "and" gate 16 also causes bi-stable circuit 20 to change from stable state $b$ to the other state $a$. Again it will be assumed that the output of the A half of bi-stable circuit 20 was low or ineffective before the application of the signal from "and" gate 16 and becomes high or effective upon the application of this signal. The output of bi-stable circuit 20 and the clocking pulses mentioned above are supplied to the two inputs of "and" gate 12.

The first clock pulse passing "and" gate 16 also passes "and" gate 12 and causes unit 24 of register 22 to change its state thus subtracting unity from the number in register 22. Suppose this change is in a direction as to have no effect on unit 26, corresponding to a change from "one" to "zero" in unit 24. The second clock pulse passing "and" gate 12 will cause unit 24 to return to its initial "one" or high state. This second change will be in a direction to cause unit 26 to change it state because of the signal supplied thereto through capacitor 34. Suppose that this change has no effect on unit 28. Then the second change of state of unit 26 will cause unit 28 to change its state. Those familiar with registers of this type will recognize that the application of a number of clock pulses corresponding to the number represented by the information originally supplied to register 22 will reset register 22 so that the output signal from the B halves of all four units is high. The high output signal from the four units of register 22 will cause "and" gate 40 to produce an output signal. This output signal changes the state of bi-stable circuit 20 and prevents the further application of clock pulses to register 22. The output signal of "and" gate 40 is also supplied to the input of delay means 44. The initial setting of register 50 will have conditioned one of "and" gates 70 through 77 to pass a signal upon the occurrence of a signal at a corresponding tap on delay means 44. For example, if registers 52 and 54 are set so that the A halves of these two units are at high potential and unit 56 is set so that the B half is at high potential, "and" gate 76 will be conditioned to pass a signal upon the occurrence of a signal at the 6/8 tap of delay means 44. All of the other "and" circuits will have one or more input leads at a low potential so that they will not pass a signal even though it appears at the corresponding tap on delay means 44. In the example chosen above, the output signal of "and" gate 40 will pass down delay means 44 without affecting any of the "and" gate 70 through 77 until it reaches the 6/8 tap on delay means 44. Upon the appearance of the signal at the 6/8 tap, "and" gate 76 will generate an output signal which will be passed by "or" gate 80. The signal from "or" gate 80 will change bi-stable circuit 18 to its original stable state $b$. The signal appearing at the output lead shown in Fig. 1 will have the form of a rectangular pulse which has a leading edge corresponding in time to the first change in stable state of circuit 18, and a trailing edge corresponding in time to the second change in state of circuit 18 brought about by the signal supplied by "or" circuit 80. The number of whole clock pulse periods contained in this rectangular pulse will correspond to the number represented by the code originally impressed on register 22 and the number of additional ⅛ periods of the clock pulse contained in the rectangular pulse will correspond to the number represented by the code impressed on register 50.

The system of Fig. 1 is arranged to respond to information in binary code form. However, it will be obvious to those familiar with computer circuits that the system may be arranged to operate with other number systems such as the decimal system or a progressive or cyclic code, for example the so-called Gray code.

In describing the operation of the system of Fig. 1 it has been assumed that the various "and" gates and "or" gates provide output signals in the form of positive pulses and that the bi-stable circuits effect the operation of other circuits associated therewith when the signal supplied thereby goes from a low potential to a high potential. It should be understood that the invention is not to be limited to this choice of signal polarities. Inverters and circuits responsive to negative pulses may be used whenever this is found to be convenient.

Figure 2:
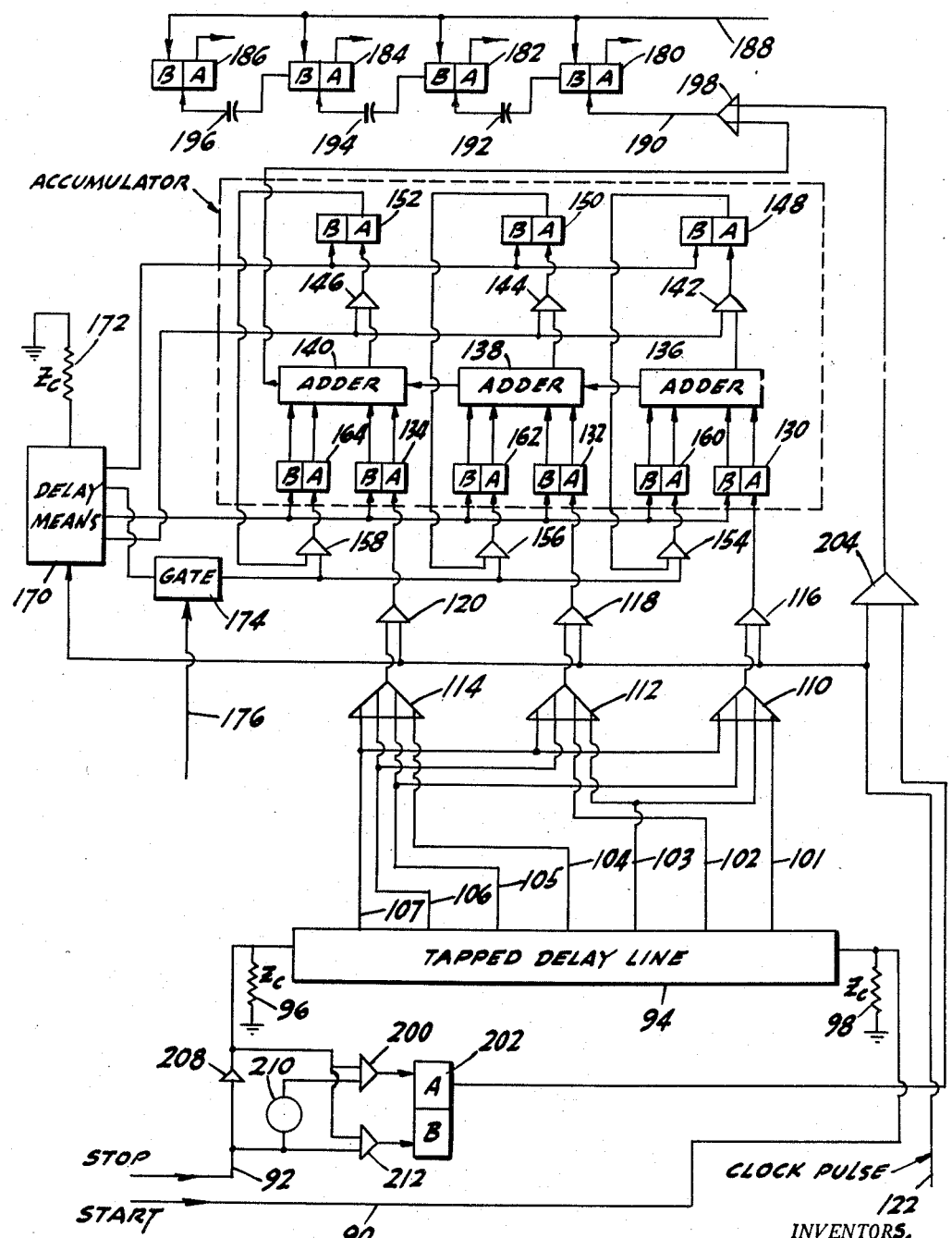
Fig. 2 is a block diagram of a second preferred embodiment of the invention which may be employed to represent the duration of an input signal as an electrical code.

The system of Fig. 2 is arranged to provide an output signal in the form of an electrical code which represents the time duration of an input signal. The system of Fig. 2 is arranged so that it is not necessary to synchronize the input signal with the clock pulses used to generate the electrical code. This is accomplished by first measuring the time interval between the start pulse and the next occurring clocking pulse and storing this information in a suitable accumulator. Next, the number of whole clock pulse periods in the remaining interval are measured and stored in a suitable register. Finally, the interval between the last whole clock pulse period and the end of the interval signal is measured and combined with the previously measured and stored fractional period.

The input signal is supplied to the system of Fig. 2 in the form of an impulse on conductor 90 at the start of the interval to be represented and a second signal on conductor 92 at the end of the interval to be represented. If the signal to be represented is initially in the form of an rectangular voltage pulse, this signal can be differentiated to provide the necessary impulses on conductors 90 and 92. Conductor 92 forms one input to a tapped delay line 94. A delay line has been shown in Fig. 2 since a delay line will propagate a signal from either end toward the other. However, any suitable delay means, other than a delay line, may be used in place of delay line 94 provided a signal may be propagated therethrough in both directions. If unidirectional delay means such as delay multivibrators are employed, it will be necessary to provide two parallel paths, one for propagating the signal in one direction and the other for propagating the signal in the opposite direction. Delay line 94 is terminated in its characteristic impedance at both ends by impedances 96 and 98, respectively. Therefore signals may be supplied to either end of delay line 94 without causing reflection of the signal from the opposite end of the delay line. Delay line 94 is provided with a series of taps 101 through 107. Taps 101 through 107 are arranged so that the delay between adjacent taps is equal to ⅛ of the total delay of delay line 94. Taps 101 through 107 form the input leads to "or" gates 110, 112 and 114. Taps 101, 102 and 104 are connected to "or" gates 110, 112 and 114, respectively. Tap 103 is connected to both "or" gate 110 and "or" gate 112. Tap 105 is connected to "or" gates 110 and 114. Tap 106 is connected to "or" gates 112 and 114 and tap 107 is connected to "or" gates 110, 112 and 114. The output of "or" gates 110, 112 and 114 form one input of "and" gates 116, 118 and 120, respectively. The second input of each of "and" gates 116, 118 and 120 is supplied with clock pulses from conductor 112. The accumulator associated with "and" gates 116, 118 and 120 is a form of recirculating accumulator—that is, information stored in the accumulator is continually being transferred from an input register, through the adder circuits to the output register, and then back to the input register. It may be considered that the accumulator is performing an addition in response to each clock pulse. However, since the input of one of the registers is "zero" except when a pulse is present in delay line 94, the sum is the same as the information stored in the other register. Since the accumulator is performing an addition for each clock pulse it is possible to introduce new information as often as once every clock pulse. The accumulator shown in Fig. 2 is but one of many forms of accumulators which may be employed in the present invention. Therefore the invention is not to be limited to the particular accumulator circuit shown in the drawings. Although the accumulator shown is suitable for binary numbers, the invention may be employed with number representations other than binary if appropriate coding is provided between delay line 94 and "or" gates 110, 112 and 114 and if an appropriate accumulator is used. In Fig. 2 the outputs of "and" gates 116, 118 and 120 are connected to the A sides of bi-stable circuits 130, 132 and 134, respectively. These three circuits comprise three units of one input register of the accumulator. An output is taken from each side of bi-stable circuit 130 to the adder circuit 136. Adder 136 may be any conventional form of binary adder circuit. The two connections from bi-stable circuit 130 to adder circuit 136 are provided so that "ones" and "zeros" may be transferred, thereby making it unnecessary to clear the adder circuit 136 before introducing new information from bi-stable circuit 130. Bi-stable circuits 132 and 134 are connected in a similar manner to adder circuits 138 and 140.

Adder circuits 136, 138 and 140 are connected through "and" gates 142, 144 and 146, respectively, to a three-unit output register comprising bi-stable circuits 148, 150 and 152. Again bi-stable circuits 148, 150 and 152 may be so-called Eccles-Jordan trigger circuits or some other form of bi-stable circuit. The A sides of bi-stable circuits 148, 150 and 152 are connected through "and" gates 154, 156 and 158, respectively, to a second three-unit input register comprising bi-stable circuits 160, 162 and 164. Bi-stable circuits 160, 162 and 164 are connected to adder circuits 136, 138 and 140, respectively. Adder circuits 136, 138 and 140 are arranged to combine the signals supplied by the two input registers associated therewith and to provide an indication of the sum through "and" gates 142, 144 and 146, respectively, to the output register comprising bi-stable circuits 148, 150 and 152. A connection is made from adder 136 to adder 138 and from adder 138 to adder 140 to permit "carry" information to be transferred from one adder circuit to the next more significant adder circuit. For example, if a "one" appears at both input registers 130 and 160 of adder 136, a "zero" will be supplied to output register 148 and a "carry" signal will be supplied to adder 138. Adder 138 will combine this "carry" signal with the information supplied to registers 132 and 162.

The various adder circuits and registers of the accumulator are controlled by signals received from delay means 170. Delay means 170 is supplied with clock pulse signals from conductor 122 and provides four spaced output signals. Delay means 170 may be a tapped delay line terminated in its characteristic impedance 172 or it may be a series of delay multivibrators. In fact any circuit, whether a delay circuit or not, which will provide the four spaced output signals may be employed.

The maximum delay provided by this circuit should be less than one clock pulse period. The first tap on delay means 170 is connected to "and" gates 142, 144 and 146, respectively. The second tap on delay means 170 is connected to the B side of input registers 130, 132, 134, 160, 162 and 164. The third tap of delay means 170 is connected to a second input of "and" gates 154, 156 and 158 through an inhibit gate circuit 174. Gate circuit 174 is normally operative to permit the passage of signals from the third tap of delay means 170 to be supplied to "and" gates 154, 156 and 158. However, gate circuit 174 may be rendered inoperative to pass signals by a signal supplied by way of conductor 176. The final tap of delay means 170 is connected to the B halves of output registers 148, 150 and 152.

As will be explained presently, the signal appearing at the first tap on delay means 170 is employed to cause information to be gated out of adders 136, 138 and 140 to units 148, 150 and 152 of the output register. The signal appearing at the second tap of delay means 170 is employed to clear all three units of both input registers of any previously stored information. The signal appearing at the third tap of delay means 170 is employed as a "gate around" signal which permits information to be transferred from the units 148, 150 and 152 of the output register to the previously cleared units 160, 162 and 164 of the input register. The signal appearing at the final tap of delay means 170 is employed as a "clear" signal for the output register of the accumulator.

The main interval register of the system of Fig. 2 is a four-unit register comprising bi-stable elements 180, 182, 184 and 186. This register is in the form of a counter which indicates the number of pulses which have been supplied thereto. A connection 188 is made to the B side of each of the bi-stable circuits in this register to permit the register to be cleared of previously stored information. Capacitors 192, 194 and 196 are provided for transferring "carry" information from one unit of the register to the next more significant unit. The input to the main register is provided by conductor 190. Conductor 190 is connected to the output of adder 140 through "or" gate 198.

Turning once again to the delay line 94, the left hand end of this delay line is connected through "and" gate 200 to the A side of the bi-stable circuit 202. The output of bi-stable circuit 202 is supplied to one input of "and" circuit 204 which is also supplied with clock pulses from conductor 122. The output of "and" gate 204 is connected to a second input of "or" gate 198.

Conductor 92 to which a stop signal is supplied is connected by buffer circuit 208 to the left hand end of tapped delay line 94. Buffer circuit 208 may be any circuit which will permit the passage of a signal from conductor 92 to delay line 94 but not in the reverse direction. In the explanation which follows, it will be assumed that buffer 208 does not invert the signal supplied to it. Conductor 92 is also connected by way of inverter 210 to a second input of gate 200. Inverter 210 may be any circuit which in the absence of a positive signal on conductor 92 will condition "and" gate 200 to pass a signal appearing at the second input of this "and" gate. For example, inverter 210 may be a single stage amplifier circuit which has a high output potential in the absence of a positive signal supplied to its input connection. Conductor 92 and the output of buffer 208 are connected to two inputs of "and" gate 212. The output of "and" gate 212 is connected to the B side of bi-stable circuit 202.

The system of Fig. 2 operates in the following manner. Assume for the moment that the two input registers of the accumulator, the output register of the accumulator and the main register of the system all have been cleared of any previously stored information. The start signal appearing on conductor 90 is supplied to the right hand end of delay line 94. This start signal, which is in the form of a positive pulse, will appear at taps 101 through 107 in succession. Each time the start signal appears at one of taps 101 through 107 an output signal will appear at one or more of "or" gates 110, 112 and 114. For example, when the start signal appears at tap 101 an output signal appears at the output of "or" gate 110. When the start signal appears at tap 105 an output signal will appear at the output of "or" gates 110 and 114 because of the connection of tap 105 to both of these "or" gates. Clock pulses from conductor 122 are supplied to one input of each of the three "and" gates 116, 118 and 120. These clock signals by themselves will not produce an output from "and" gates 116, 118 and 120. However, if a clock pulse from conductor 122 coincides in time with an output pulse from any of "or" gates 110, 112 or 114, an output signal will appear at the output of each "and" gate associated with an energized "or" gate. Since the total delay time of tapped delay line 94 is equal to only one period of the clock pulse signals supplied to conductor 122, there will be only one clock pulse which coincides in time with a signal appearing at one of taps 101 through 107. Assume for the moment that the start pulse occurs ⅜ of a period after the occurrence of a clock pulse. Under these conditions the start pulse will travel down delay line 94 until it reaches tap 105 before it coincides with the next occurring clock pulse on conductor 122.

As suggested above, the occurrence of the start pulse at tap 105 will cause an output signal to appear at the outputs of "and" gates 116 and 120. No output signal will occur at the output of "and" gate 118. The output signals of "and" gates 116 and 120 will cause bi-stable circuits 130 and 134, respectively, to register a received pulse. The registration of a signal will hereinafter be referred to as the registration of a "one." The absence of any registration of a signal will be referred to as the registration of a "zero." Since no signal is supplied to bi-stable circuit 132, this bi-stable circuit will continue to register "zero."

The clock pulse which caused a signal to be transmitted through "and" gates 116 and 120 is also supplied to the input of delay means 170. As mentioned earlier, bi-stable circuits 160, 162 and 164 have been previously cleared and all register a "zero." Therefore adder 136 will register the sum of a "one" and a "zero" which is a "one." Adder 138 will register the sum of two "zeros" which is "zero" and adder 140 will register the sum of a "one" and a "zero" which is a "one." A short while after the clock pulse is supplied to the input of delay line 170 a signal will be supplied to "and" gates 142, 144 and 146. This signal will permit a "one" to be transferred to a unit of the output register from any one of the three adders indicating a "one" but no transfer will occur if the adder is registering a "zero." In the example chosen above, a "one" will be transferred from adder 136 and stored in bi-stable element 148. No signal will be passed by "and" gate 144 so bi-stable circuit 150 will continue to register a "zero." Similarly, a "one" will be transferred from adder 140 through "and" gate 146 to bi-stable circuit 152.

The signals appearing at bi-stable elements 148, 150 and 152 will also appear at the inputs of "and" gates 154, 156 and 158, respectively. However, no signals will appear at the outputs of these three "and" gates because of the lack of a signal at the other input thereof.

After the information from adders 136, 138 and 140 has been transferred to registers 148, 150 and 152, a signal occurs on the second tap of delay means 170 which clears registers 130, 132, 134, 160, 162 and 164. Therefore the signal transferred out of "or" gates 110, 112 and 114 is now stored in the units 148, 150 and 152 of the output register of the accumulator. When a signal appears at the third tap of delay means 170, signals will be passed through "and" gates 154, 156 and 158 to cause bi-stable circuits 160, 162 and 164 to register the same information as that stored on bi-stable circuits 148, 150 and 152. Following the storage of signals on bi-stable circuits 160, 162 and 164 a signal appears at the fourth tap of delay means 170 which clears bi-stable circuits 148, 150 and 152 with the previously stored information. By the time the next clock pulse appears on conductor 122, the start pulse will have passed the entire length of delay line 94 so that no coincidence will occur between a signal on one of the taps of delay line 94 and a clock pulse. Therefore no signals will appear at the output of "and" gates 116, 118 and 120. Examination of the circuit of Fig. 2 will show that, under these circumstances, bi-stable circuits 130, 132 and 134 will continue to register "zeros." In the example chosen above, adder circuits 136, 138 and 140 now register "one," "zero" and "one," respectively. This stored information will be transferred from units 160, 162 and 164 of the input register to units 148, 150 and 152 of the output register and then back to units 160, 162 and 164 for every clock pulse supplied to delay means 170. The advantage of a recirculating accumulator of this type is that information may be transferred into or out of the accumulator after only a very short delay. In a second type of accumulator (not shown) in which information is first stored in a register and then read out by applying a succession of clocking pulses to the register to count the register back to "zero," several periods of the clocking pulse may be required before information may be read into or out of the accumulator.

Leaving the accumulator for a moment and returning to tapped delay line 94, the start signal passes down delay line 94 and appears at one input of "and" gate 200. It also appears at one input of "and" gate 212. Since no stop signal is present on conductor 92, one input of "and" gate 212 will be at a low potential and no signal will be transferred through "and" gate 212 to the B side of bi-stable circuit 202. However, since no signal appears at conductor 92, the upper side of inverter 210 will be at a high potential. The high potential at the output of inverter 210 and the start signal appearing at the output of delay line 94 will cause a signal to be transferred through "and" gate 200 to the A side of bi-stable circuit 202.

In its initial condition bi-stable circuit 202 supplied a signal to "and" gate 204 which prevented clock pulses on conductor 122 from passing through "and" gate 204. However, the change in state of bi-stable circuit 202 resulting from the appearance of the start pulse at the output of delay line 94 will cause a signal to be supplied to "and" gate 204 which will permit clock pulses to pass therethrough. The clock pulses passing through "and" gate 204 will also pass through "or" gate 198 to the input of bi-stable circuit 180. Bi-stable circuit 180 and bi-stable circuits 182, 184 and 186 have previously been cleared by a signal supplied by way of line 188. The first clock pulse will cause bi-stable circuit 180 to register a "one" but it will have no effect on bi-stable circuits 182, 184 and 186. The second clock pulse will reset bi-stable circuit 180 to "zero" and cause a "carry one" signal to be transferred by way of capacitor 192 to bi-stable circuit 182. The third clock pulse will again set bi-stable circuit 180 to register a "one" and no signal will be transferred by way of capacitor 192. It will be noted that the register now reads "zero," "zero," "one," "one," which is the binary equivalent of the decimal number 3. The fourth clock pulse will reset bi-stable circuit 180 to represent "zero." The "carry" signal transferred by way of capacitor 192 will cause bi-stable circuit 182, which was previously set to register a "one," to register a "zero" and to provide a "carry one" pulse by way of capacitor 194 to bi-stable circuit 184. Reading from left to right the register now indicates "zero," "one," "zero," "zero," which is the binary representation of decimal number 4. This number 4 corresponds to the four clock pulses which have been supplied by way of conductor 190.

Suppose now that the stop signal appears on conductor 92 ⅝ of a period after the fourth registered clock pulse has passed through "and" gate 204. The occurrence of the stop signal on conductor 92 will cause two signals to be supplied to the input of "and" gate 212. One signal is supplied directly from conductor 92 to "and" gate 212, and the other signal is supplied by way of buffer 208 to the second input of "and" gate 212. The buffer 208 does not invert the signal passing therethrough so that "and" gate 212 will be conditioned to pass a signal to the B side of circuit 202. In response to the stop signal the output of inverter 210 renders "and" gate 200 incapable of passing to the A side of bi-stable circuit 202 the stop signal appearing at the output of buffer 208. The signal to the B side of bi-stable circuit 202 causes "and" gate 204 to be inoperative to pass further clock pulses.

The stop signal at the output of buffer 208 is supplied also to the left input of tapped delay line 94. The stop signal will travel down delay line 94 from left to right and will appear at taps 107, 106, etc. in succession. Clock pulses from conductor 122 are still being supplied to "and" gates 116, 118 and 120. In the example chosen for illustration here, the stop pulse will travel ⅔ of the length of delay line 94 before coinciding in time with a clock pulse supplied by way of conductor 122. Therefore coincidence will occur when the stop pulse is at tap 106 which corresponds to a distance of ⅝ of a period from the right hand end of delay line 94. Tap 106 supplies a signal to "or" gates 112 and 114. Reading from left to right it will be seen that the "or" gates 114, 112 and 110 supply the signals "one," "one," "zero," which is the binary equivalent of a decimal number 6. This corresponds to the interval of ⅝ of a period from the last clock pulse to the stop pulse.

The simultaneous application of signals from "or" gates 114 and 112 and the clock pulse supplied by conductor 122 to "and" gates 120 and 118, respectively, will cause a "one" to be registered in bi-stable circuits 134 and 132, respectively. Bi-stable element 130 will continue to register a "zero." It will be remembered that these bi-stable elements 134 and 132 had previously been cleared of the information stored at the start of the operation of the circuit of Fig. 2 by a signal from delay means 170.

It should be recalled that the ⅝ of a period interval between the time of occurrence of the start pulse and the next occurring clock pulse on conductor 122 had caused a "one" to be registered in bi-stable circuit 160, a "zero" to be registered in bi-stable circuit 162, and a "one" to be registered in bi-stable circuit 164. Therefore adder 136 is supplied with a "one" from bi-stable circuit 160 and a "zero" from bi-stable circuit 130. Under these conditions a "one" signal will be transferred to bi-stable circuit 148. Adder 138 is supplied with a "zero" signal from bi-stable circuit 162 and a "one" signal from bi-stable circuit 132 so it will transfer a "one" to bi-stable circuit 150. No "carry" signals will be transferred from adder 136 to adder 138 nor from adder 138 to adder 140. Adder 140 is supplied with a "one" signal from bi-stable circuit 164 and a "one" signal from bi-stable circuit 134. Therefore a "zero" signal will be transferred to bi-stable circuit 152 and a "carry" signal will be supplied from adder 140 to "or" gate 198. The "carry" signal supplied to "or" gate 198 will cause the main register to advance by one count in the same manner as clock pulses caused the register to advance by one count for each clock pulse.

A short while after the information is registered on bi-stable circuits 130, 132 and 134 a signal will appear at the first tap of delay means 170. This signal will cause the information in adder circuits 136, 138 and 140 to be transferred to bi-stable circuits 148, 150 and 152. This transfer is made by way of "and" gates 142, 144 and 146. The main register now registers the binary equivalent of the decimal five and the accumulator registers the binary count "zero," "one," "one," which is equivalent to the decimal number 3. The total registered interval then is 5 ⅜ units. It will be seen that this is the sum of four whole units, ⅝ of a unit and ⅝ of a unit. The information stored in the main register will remain there until it is removed by a "clear" signal supplied by way of conductor 188. The fractional information stored in the accumulator will remain there until it is cleared by a signal supplied by way of conductor 176. The signal may be transferred out of the circuit of Fig. 2 by suitable connections to the bi-stable elements 180, 182, 184 and 186 and to the bi-stable circuits 160, 162 and 164.

It should be noted that the accumulator is composed of adding circuits and registers connected by suitable "and" gates. These adding circuits and registers are basic elements in any computer system. Therefore, while the system of Fig. 2 has been illustrated as a complete self-contained system, it may be more economical to connect permanently only the delay lines 94 and 170 and the circuits immediately associated therewith, and to employ the adding circuits and registers of the main computer for the remainder of the system. The necessary circuits may be connected together in the manner shown in Fig. 2 by suitable programming instructions supplied to the computer. Once a time interval has been measured, any information stored in the main register and the output register of the accumulator may be transferred to the storage section of the computer until it is needed in further operations with the computer.

The circuit shown in Fig. 2 will measure a time interval to the nearest ⅛ of a clock pulse period. More precise measurement may be obtained by providing a delay line with more taps. For example, the interval may be divided into sixteenths by substitution of a delay line having fifteen equally-spaced taps plus an output tap. A sixteen unit delay line would require one additional "or" gate corresponding to "or" gate 110, and each "or" gate would require five inputs. The accumulator would be required to handle four binary digits rather than the three binary digits which can be handled by the system shown in Fig. 2. However, the programming of the accumulator would be exactly the same as the one shown in Fig. 2 and the signals could be supplied thereto from delay means 170. It will be obvious that other units could be added to the main register to handle more than sixteen main intervals.

The use of the binary scale in reading signals out of tapped delay line 94 is subject to certain disadvantages. The duration of the start pulses must be great enough so that coincidence always occurs between a clock pulse and a start or stop pulse passing down delay line 94. However, these pulses should not be great enough to appear at two taps at the same time. Suppose, however, that for some reason the start pulse increased in length so that it occurred at taps 103 and 104 simultaneously. Tap 103 supplies a signal to "or" gates 110 and 112, but no signal to "or" gate 114. Tap 104 supplies a signal to "or" gate 114, but no signal to "or" gates 110 and 112. However, if a start signal appears at taps 103 and 104 simultaneously with the occurrence of a clock pulse on conductor 122, "or" gates 110, 112 and 114 will all be energized and it will appear as if a start signal was present at tap 107 of the delay line. Looking at this another way, the difficulty arises because the sum of the binary signals generated by a start signal appearing at taps 103 and 104 simultaneously is equivalent to the signal generated in response to a start signal appearing at tap 107. This difficulty may be overcome by rearranging the connections from the taps of delay line 94 to "or" gates 110, 112 and 114 to correspond to the so-called progressive code or Gray code. The so-called progressive or Gray code is a binary system of notation in which only one digit is changed in going from one number to the next. In this system the digits do not bear any direct relationship to powers of 2. The code for the first eight decimal numbers is as follows:

```
0—000
1—001
2—011
3—010
4—110
5—111
6—101
7—100
```

Fig. 3 shows a delay line and "or" circuits connected to receive this progressive code. The three "or" gates in the circuit of Fig. 3 have been given the numbers 110', 112' and 114'. However, these "or" gates are identical or may be identical to the "or" gates 110, 112 and 114 of the system of Fig. 2. It is merely the connection from "or" gates 110', 112' and 114' to the delay line 94 that is different. Note that tap 101 is connected only to "or" gate 110'. Tap 102 is connected to "or" gates 110' and 112'. The connections from each of the taps are so made that reading from left to right the output of the three "or" gates will always correspond to the chosen progressive code. Suppose now that a start signal appears at tap 103. The output will read "zero," "one," "zero." If the tap appears at tap 104, the output will read "one," "one," "zero." If the signal occurs at taps 103 and 104 simultaneously, the output signal will still read "one," "one," "zero" corresponding to tap 104. Similarly, if the signal should occur simultaneously at taps 105 and 106, the output signal will read "one," "one," "one" corresponding to tap 105. The only disadvantage in using a Gray code system of this type is that it is not convenient to calculate using this code. Therefore the information read out of the accumulator using the progressive code should be fed through a progressive-to-binary converter. Converters of this type are well known in the art and are in use in existing computers.

Another possible modification of the system of Fig. 2 is the omission of "and" gate 212 at the input of the B side of bi-stable circuit 202. The conductor 92 may be connected directly to the input of buffer 208, inverter 210 and to the B side of bi-stable circuit 202.

While there have been described what are at present considered to be the preferred embodiments of the invention, it will be apparent that various modifications and other embodiments thereof will occur to those skilled in the art within the scope of the invention. Accordingly we desire the scope of our invention to be limited only by the appended claims.

What is claimed is:

1. A circuit for generating a representation of a time interval in the form of a binary code of electrical signals, said circuit comprising, a source of clock pulses, a source of a start signal, a source of a stop signal, said start signal and said stop signal being spaced apart by said interval to be represented, a delay means having a total delay time equal to one repetition period of said clock pulses, said delay means being provided with an input circuit at a first end, an input-output circuit at the other end, and $n$ intermediate taps, where $n$ is an integral number, said taps, if numbered from 1 to $n$, being arranged in order according to number from said first end to said second end, the delay time between adjacent taps, between said first tap and said first end, and between said $n$th tap and said second end being equal to $T/n+1$, where T is the interpulse period of said clock pulses, $d$ coincidence circuits, where $d$ is the number of places required to represent in binary form the number $n$, the output of each of said coincidence circuit representing one place in a portion of said binary code, the output of each coincidence circuit, when energized, representing one of the two possible digits of said place and, when de-energized, representing the other of the two possible digits of said place, means connecting each of said taps to such of said coincidence circuits as should be energized to cause said coincidence circuits collectively to provide a binary representation of the order number of said tap, means for supplying said start signal to said input circuit of said delay means, means for supplying said stop signal to said input-output circuit of said delay means, means for supplying said clock pulses to each of said coincidence circuits, an accumulator associated with said coincidence circuits for storing the information supplied thereby, said accumulator being constructed and arranged to provide an output signal representative of the binary sum of the signals received from said coincidence circuits in response respectively to the coincidence of a clock pulse and a delayed start signal at one of said taps and the coincidence of a clock pulse and a delayed stop signal at one of said taps, and a counting circuit associated with said source of clock pulses and said input-output circuit for registering in binary form the number of clock pulses occurring between said two coincidences.

2. A circuit for generating a representation of a time interval in the form of a multi-placed code of electrical signals, each place of said code being occupied by one of two possible digits, said circuit comprising, a source of clock pulses, a source of a start signal, a source of a stop signal, said start signal and said stop signal being spaced apart by said interval to be represented, a delay means having a total delay time equal to one repetition period of said clock pulses, said delay means being provided with an input circuit at a first end, an input-output circuit at the other end, and $n$ intermediate taps, where $n$ is an integral number, said taps, if numbered from 1 to $n$, being arranged in order according to number from said first end to said second end, the delay time between adjacent taps, between said first tap and said first end, and between said $n$th tap and said second end being equal to $T/n+1$, where $T$ is the interpulse period of said clock pulses, $d$ coincidence circuits, where $d$ is the number of places required to represent the number $n$ in said multi-placed code, the output of each of said coincidence circuits representing one place in a portion of said code, the output of each of said coincidence circuits, when energized, representing one of the two possible digits of said place and, when de-energized, representing the other of the two possible digits of said place, means connecting each of said taps to such of said coincidence circuits as should be energized to cause said coincidence circuits collectively to provide a representation of the order number of said tap in said multi-place code, means for supplying said start signal to said input circuit of said delay means, means for supplying said stop signal to said input-output circuit of said delay means, means for supplying said clock pulses to each of said coincidence circuits, an accumulator associated with said coincidence circuits for storing the information supplied thereby, said accumulator being constructed and arranged to provide an output signal representative of the combined interval represented by the signals received from said coincidence circuits in response respectively to the coincidence of a clock pulse and a delayed start signal at one of said taps and the coincidence of a clock pulse and a delayed stop signal at one of said taps, a pulse counting circuit, means responsive to the appearance of a delayed start signal at said intput-output circuit for initiating the operation of said counting circuit, means responsive to the receipt of a stop signal for terminating the operation of said counting circuit, means for supplying said clock pulses to said counting circuit, said counting circuit being arranged to register the number of clock pulses supplied thereto in the interval in which it is operative, the output signals of said counting circuit providing an indication in said selected code of the integral number of clock pulse intervals contained in said interval to be represented and the output signals of said accumulator providing a representation of the number of additional fractional parts of a clock pulse interval contained within said interval to be measured.

3. In combination with a source of a first control impulse, a source of a second control impulse, and a source of regularly occurring clock impulses, means for generating a representation in binary form of the time difference between the interval between said first control impulse and said second control impulse and an interval equal to an integral number of interpulse periods of said clock impulses, means comprising: a delay means having a total delay time equal to one interpulse period of said clock impulses, said delay means being provided with an input circuit at a first end, an input circuit at a second end and $n$ intermediate output circuits, where $n$ is an integral number, said intermediate output circuits, if numbered from 1 to $n$, being arranged in order according to number from said first end to said second end, the delay time between adjacent intermediate output circuits, between said first intermediate output circuit and said first end and between said $n$th intermediate output circuit and said second end being equal to $T/n+1$, where $T$ is the interpulse period of said clock impulses, $d$ coincidence circuits, where $d$ is the number of places required to represent in binary form the number $n$, the output of each of said coincidence circuits representing one place in a portion of said binary code, the output of each coincidence circuit, when energized, representing one of the two possible digits of said place and, when de-energized, representing the other of the two possible digits of said place, means connecting each of said intermediate output circuits to such of said coincidence circuits as should be energized to cause said coincidence circuits collectively to provide a binary representation of the order number of said intermediate output circuits, means for supplying said first control impulse to said input circuit at said first end of said delay means, means for supplying said second control impulse to said input circuit at said second end of said delay means, means for supplying said clock impulses to each of said coincidence circuits, and an accumulator associated with said coincidence circuits for first registering the binary number represented at the output of said coincidence circuits as a result of the application of said first control impulse, again registering the binary number represented at the output of said coincidence circuits as a result of the application of said second control impulse, and for providing an indication of the sum of said two registered binary numbers.

4. A system in accordance with claim 3, said system further comprising a counting circuit arranged to register the number of impulses supplied thereto, control means coupling said source of clock impulses to the input of said counting circuit, first coupling means coupling said source of said first control impulse to said control means, said first coupling means being arranged to condition said control means to pass clock impulses occurring more than one interpulse period of said clock impulses following the occurrence of said first control impulse, and second means coupling said source of said second control impulse to said control means, said second coupling means being arranged to condition said control means to block the passage of further clock impulses upon the occurrence of said second control impulse.

5. Means for generating a coded representation of the time interval between a randomly occurring impulse signal and one of a regularly recurring series of clock impulses, said means comprising a first input connection to which said source of randomly occurring impulse signals may be connected, a second input connection to which a source of said regularly recurring clock impulses may be connected, means connected to said first input connection for generating a plurality of spaced impulses in response to the occurrence of said randomly occurring impulse signal, the time spacing between said spaced impulses being a selected fraction of the time spacing between said clock impulses, the time interval between the occurrence of said random signal and the last of said spaced impulses being at least as great as the time spacing between said random signal and the next occurring clock impulse, a plurality of coincidence circuits, means for supplying said clock impulses to one input of each of said coincidence circuits, means for supplying a different combination of said spaced impulses to a second input of each of said plurality of coincidence circuits, said coincidence circuits each being arranged to provide an output signal upon the simultaneous application thereto of one of said clock impulses and one of said spaced impulses.

6. Means for generating a coded representation of the difference between the time interval limited by first and second randomly occurring impulse signals and the time interval represented by an integral number of periods of a regularly recurring series of clock impulses, said system comprising a bi-directional delay means having a delay time equal to the time spacing between adjacent clock impulses, said delay means being provided with first and second input connections and a plurality of output taps, said delay means being so constructed that a signal supplied to said first input connection causes a delayed signal to appear at said output taps in a first succession and a signal supplied to said second input connection causes a delayed signal to appear at said output taps in the opposite succession, the time delay between adjacent output taps being substantially equal, means connected to said first input connection of said delay means for supplying said first randomly occuring impulse thereto, means connected to said second input connection of said delay means for supplying said second randomly occurring impulse thereto, a plurality of coincidence circuits, means connecting a different plurality of said output taps to each of said coincidence circuits, said connecting means being so arranged that the combination of said coincidence circuits energized by a signal at any one of said output taps is different from the combination energized by a signal at any other of said output taps, means for supplying said regularly recurring clock impulses to a second input of each of said coincidence circuits, each of said coincidence circuits being arranged to pass a signal only upon the simultaneous application thereto of one of said clock impulses and a signal from one of said output taps, and summation means connected to the outputs of said coincidence circuits and responsive to the coded representations generated thereby in response to the application of said first and second randomly occurring impulse signals for generating a signal representative of the sum of the time intervals represented by said two last-mentioned coded representations.

7. A system in accordance with claim 6, said system further comprising counting means responsive to said first and second randomly occurring impulses and said clock impulses for registering in coded form the number of clock impulses occurring between said two randomly occurring impulse signals.

8. In combination with a source of a first control impulse, a source of a second control impulse, and a source of regularly recurring clock impulses, means for generating a representation in the form of a multi-placed code of electrical signals of the time difference between the interval between said first control impulse and said second control impulse and an interval equal to an integral number of interpulse periods of said clock impulses, said means comprising: a bi-directional delay means having a total delay time equal to one interpulse period of said clock impulses, said delay means being provided with a first input circuit, a second input circuit and $n$ intermediate output circuits, where $n$ is an integral number, said intermediate output circuits if numbered from 1 to $n$, being arranged in order according to number from said first input circuit to said second input circuit, the delay time between adjacent intermediate output circuits, between said first intermediate output circuit and said first input circuit and between said $n$th intermediate output circuit and said second input circuit being equal to $T/n+1$, where T is the interpulse period of said clock impulses, $d$ coincidence circuits, where $d$ is the number of places required to represent the number $n$ in said multi-placed code, the output of each of said coincidence circuits representing one place in a portion of said code, the output of each coincidence circuit when energized representing one of the two possible digits of said place and when de-energized representing the other of the two possible digits of said place, means connecting each of said intermediate output circuits to such of said coincidence circuits as should be energized to cause said coincidence circuits collectively to provide representations of the order numbers of said intermediate output circuits in said multi-placed code, means for supplying said first control impulse to said first input circuit of said delay means, means for supplying said second control impulse to said second input circuit of said delay means, means for supplying said clock impulses to each of said coincidence circuits, and means connected to the outputs of said coincidence circuits for first registering the number represented at the outputs of said coincidence circuits as a result of the application of said first control impulse, again registering the number represented at the outputs of said coincidence circuits as a result of the application of said second control impulse, and for providing a coded representation of the sum of two registered numbers.

References Cited in the file of this patent
UNITED STATES PATENTS

| | | |
|---|---|---|
| 2,418,521 | Morton et al. | Apr. 8, 1947 |
| 2,614,169 | Cohen et al. | Oct. 14, 1952 |
| 2,616,965 | Hoeppner | Nov. 4, 1952 |

OTHER REFERENCES

Proc. I.R.E., January 1952, vol. 40, No. 1, pp. 29–33, "Logical Description of Some Digital-Computer Adders and Counters," Gray.